United States Patent
Dingler et al.

(10) Patent No.: US 9,871,916 B2
(45) Date of Patent: Jan. 16, 2018

(54) SYSTEM AND METHODS FOR PROVIDING VOICE TRANSCRIPTION

(75) Inventors: John R. Dingler, Dallas, GA (US); Sri Ramanathan, Lutz, FL (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1240 days.

(21) Appl. No.: 12/398,271

(22) Filed: Mar. 5, 2009

(65) Prior Publication Data

US 2010/0228546 A1  Sep. 9, 2010

(51) Int. Cl.
| | |
|---|---|
| G10L 15/00 | (2013.01) |
| G10L 15/26 | (2006.01) |
| G10L 17/00 | (2013.01) |
| G10L 21/00 | (2013.01) |
| G10L 25/00 | (2013.01) |
| H04M 3/42 | (2006.01) |
| G09B 21/00 | (2006.01) |
| G10L 21/06 | (2013.01) |
| H04L 29/06 | (2006.01) |

(52) U.S. Cl.
CPC ...... *H04M 3/42391* (2013.01); *G09B 21/009* (2013.01); *G10L 15/26* (2013.01); *G10L 17/00* (2013.01); *G10L 2021/065* (2013.01); *H04L 65/1006* (2013.01); *H04L 65/1096* (2013.01); *H04M 2201/40* (2013.01); *H04M 2201/60* (2013.01)

(58) Field of Classification Search
None
See application file for complete search history.

(56) References Cited

U.S. PATENT DOCUMENTS

| | | | |
|---|---|---|---|
| 5,712,901 A | 1/1998 | Meermans | |
| 5,870,454 A | 2/1999 | Dahlen | |
| 5,943,398 A | 8/1999 | Klein et al. | |
| 6,173,259 B1 | 1/2001 | Bijl et al. | |
| 6,377,915 B1 * | 4/2002 | Sasaki | G10L 19/04 |
| | | | 704/206 |
| 6,377,925 B1 * | 4/2002 | Greene et al. | 704/271 |
| 6,483,899 B2 | 11/2002 | Agraharam et al. | |
| 6,507,643 B1 | 1/2003 | Groner | |

(Continued)

FOREIGN PATENT DOCUMENTS

EP  2 007 064 A1  12/2008

*Primary Examiner* — Richemond Dorvil
*Assistant Examiner* — Thuykhanh Le
(74) *Attorney, Agent, or Firm* — Christopher K. McLane; Andrew M. Calderon; Roberts Mlotkowski Safran Cole & Calderon, P.C.

(57) ABSTRACT

A system and methods is provided for providing SIP based voice transcription services. A computer implemented method includes: transcribing a Session Initiation Protocol (SIP) based conversation between one or more users from voice to text transcription; identifying each of the one or more users that are speaking using a device SIP_ID of the one or more users; marking the identity of the one or more users that are speaking in the text transcription; and providing the text transcription of the speaking user to non-speaking users.

27 Claims, 5 Drawing Sheets

(56) References Cited

U.S. PATENT DOCUMENTS

| | | | |
|---|---|---|---|
| 6,556,968 B1* | 4/2003 | Shiono | G10L 15/20 704/226 |
| 6,587,871 B1 | 7/2003 | Schrader | |
| 6,754,631 B1 | 6/2004 | Din | |
| 7,191,129 B2 | 3/2007 | Brown et al. | |
| 7,317,788 B2 | 1/2008 | Caspi et al. | |
| 7,412,486 B1 | 8/2008 | Petrack et al. | |
| 7,444,286 B2 | 10/2008 | Roth et al. | |
| 7,467,089 B2 | 12/2008 | Roth et al. | |
| 7,480,723 B2 | 1/2009 | Grabelsky et al. | |
| 7,512,125 B2* | 3/2009 | Betts | H04L 45/52 370/392 |
| 7,756,255 B1* | 7/2010 | Santharam | H04M 1/7255 379/355.04 |
| 7,889,846 B2* | 2/2011 | Beard | H04M 3/5166 379/133 |
| 7,940,702 B1* | 5/2011 | Donley | H04L 12/1818 370/260 |
| 7,974,966 B2* | 7/2011 | Robie | G06F 9/542 707/713 |
| 2002/0055973 A1* | 5/2002 | Low | G06Q 30/06 709/204 |
| 2002/0062347 A1* | 5/2002 | Low | G06Q 30/06 709/204 |
| 2002/0068545 A1* | 6/2002 | Oyama | G06Q 30/0601 455/406 |
| 2002/0073210 A1* | 6/2002 | Low | G06Q 20/40 709/228 |
| 2003/0012346 A1* | 1/2003 | Langhart | H04M 3/42221 379/67.1 |
| 2004/0024718 A1* | 2/2004 | Adar | G06N 5/00 706/12 |
| 2004/0081292 A1* | 4/2004 | Brown | H04M 3/42221 379/68 |
| 2004/0081295 A1* | 4/2004 | Brown | H04M 3/42221 379/88.13 |
| 2004/0083101 A1* | 4/2004 | Brown | G10L 15/1822 704/235 |
| 2004/0220926 A1* | 11/2004 | Lamkin | G06F 17/30017 |
| 2004/0249951 A1 | 12/2004 | Grabelsky et al. | |
| 2005/0080868 A1* | 4/2005 | Malik | G06Q 10/10 709/207 |
| 2005/0251679 A1* | 11/2005 | Narayanan | G06F 17/30011 713/170 |
| 2005/0278285 A1* | 12/2005 | Cohen | G06F 17/3043 |
| 2007/0005206 A1* | 1/2007 | Zhang | G06F 3/16 701/36 |
| 2007/0041522 A1* | 2/2007 | Abella | H04M 3/5307 379/88.14 |
| 2007/0049314 A1* | 3/2007 | Balachandran | H04W 4/10 455/518 |
| 2007/0106724 A1* | 5/2007 | Gorti | G06Q 10/10 709/204 |
| 2007/0240133 A1* | 10/2007 | Neil | G06F 9/45508 717/140 |
| 2007/0260457 A1* | 11/2007 | Bennett | G06F 17/30637 704/235 |
| 2008/0181140 A1* | 7/2008 | Bangor | H04L 65/403 370/261 |
| 2009/0030698 A1* | 1/2009 | Cerra | G10L 15/30 704/275 |
| 2009/0048845 A1* | 2/2009 | Burckart et al. | 704/270 |
| 2009/0068996 A1* | 3/2009 | Bakker | H04L 65/1016 455/414.1 |
| 2009/0086949 A1* | 4/2009 | Caspi et al. | 379/202.01 |
| 2009/0088215 A1* | 4/2009 | Caspi et al. | 455/563 |
| 2009/0089055 A1* | 4/2009 | Caspi et al. | 704/235 |
| 2009/0099845 A1* | 4/2009 | George | G10L 15/26 704/235 |
| 2009/0122198 A1* | 5/2009 | Thorn | 348/715 |
| 2009/0213844 A1* | 8/2009 | Hughston | 370/352 |
| 2009/0241175 A1* | 9/2009 | Trandal et al. | 726/7 |
| 2010/0057469 A1* | 3/2010 | Jeffs | G06F 17/30026 704/275 |
| 2010/0158213 A1* | 6/2010 | Mikan et al. | 379/88.14 |
| 2010/0158232 A1* | 6/2010 | Sylvain | 379/202.01 |
| 2010/0286979 A1* | 11/2010 | Zangvil | G06F 17/273 704/9 |

* cited by examiner

SYSTEM AND METHODS FOR PROVIDING VOICE TRANSCRIPTION

FIELD OF THE INVENTION

The invention generally relates to a system and methods of providing voice transcription and, in particular, to a system and methods for providing SIP based voice transcription services.

BACKGROUND

Faced with an increasingly difficult challenge in growing both average revenue per user (ARPU) and numbers of subscribers, wireless carriers and content providers are trying to develop a host of new products, services, and business models based on data services. For example, one such service is teletypewriter (TTY) compatible services and devices.

Illustratively, TTY devices enable visual communication via a one- or two-line electronic display between two users both equipped with TTY devices. However, only devices that are TTY can communicate to other TTY devices. Advantageously, though, carriers have also introduced wireless TTY devices, which enable a hearing or speech impaired person to be more mobile. That is, these TTY wireless devices expand the abilities of the hearing or speech impaired to conduct a conversation, regardless of their location.

Also, as instant messaging becomes more popular on cellular devices, there may be a decline in the number of TTY devices, but the TTY devices may still remain the primary communications device for hearing impaired users. A reason for this may be due to the fact that the carriers have also begun to introduce wireless TTY devices, which will enable a hearing or speech impaired person to be more mobile. In any configuration, though, there are no known devices or services available that provide transcription to text of a voice conversation.

Accordingly, there exists a need in the art to overcome the deficiencies and limitations described hereinabove.

SUMMARY

In a first aspect of the invention, a computer implemented method comprises transcribing a Session Initiation Protocol (SIP) based conversation between one or more users from voice to text transcription and identifying each of the one or more users that are speaking using a device SIP_ID of the one or more users. The method further comprises marking the identity of the one or more users that are speaking in the text transcription. The method further comprises providing the text transcription of the speaking user to non-speaking users.

In another aspect of the invention, a computer program product comprises a computer usable storage medium having readable program code tangibly embodied in the storage medium. The computer program product is operable to: listen into an established conversation between one or more users on an IMS platform; transcribe the conversation from voice to text transcription; and identify each of the one or more users in the text transcription using a device SIP_ID of the each of the one or more users.

In another aspect of the invention, a system is implemented on a computer infrastructure having at least hardware components or a combination of software components and the hardware components. The system is operable to: listen into an established conversation between one or more users; identify each of the one or more users in the conversation using a device SIP_ID of the each of the one or more users; record the conversation between the one or more users and place the conversation in a queue for the transcribing; transcribe the conversation from voice to text transcription; mark a speaking user in the text transcription using the device SIP_ID of the each of the one or more users; notify the one or more users that the text transcription is available for review; and provide the text transcription of a speaking user to a non-speaking user by instant message or text message.

In yet another aspect of the invention, a method or transcribing a voice conversation using Session Initiation Protocol (SIP) from voice to text comprises providing a computing infrastructure operable to: call into an established conversation between one or more users; identify each of the one or more users that are speaking using a device SIP_ID of the one or more users; transcribe the conversation between one or more users from voice to text transcription; mark the identity in the text transcription of the one or more users that are speaking; and provide the text transcription to the one or more users using instant messaging or text messaging.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
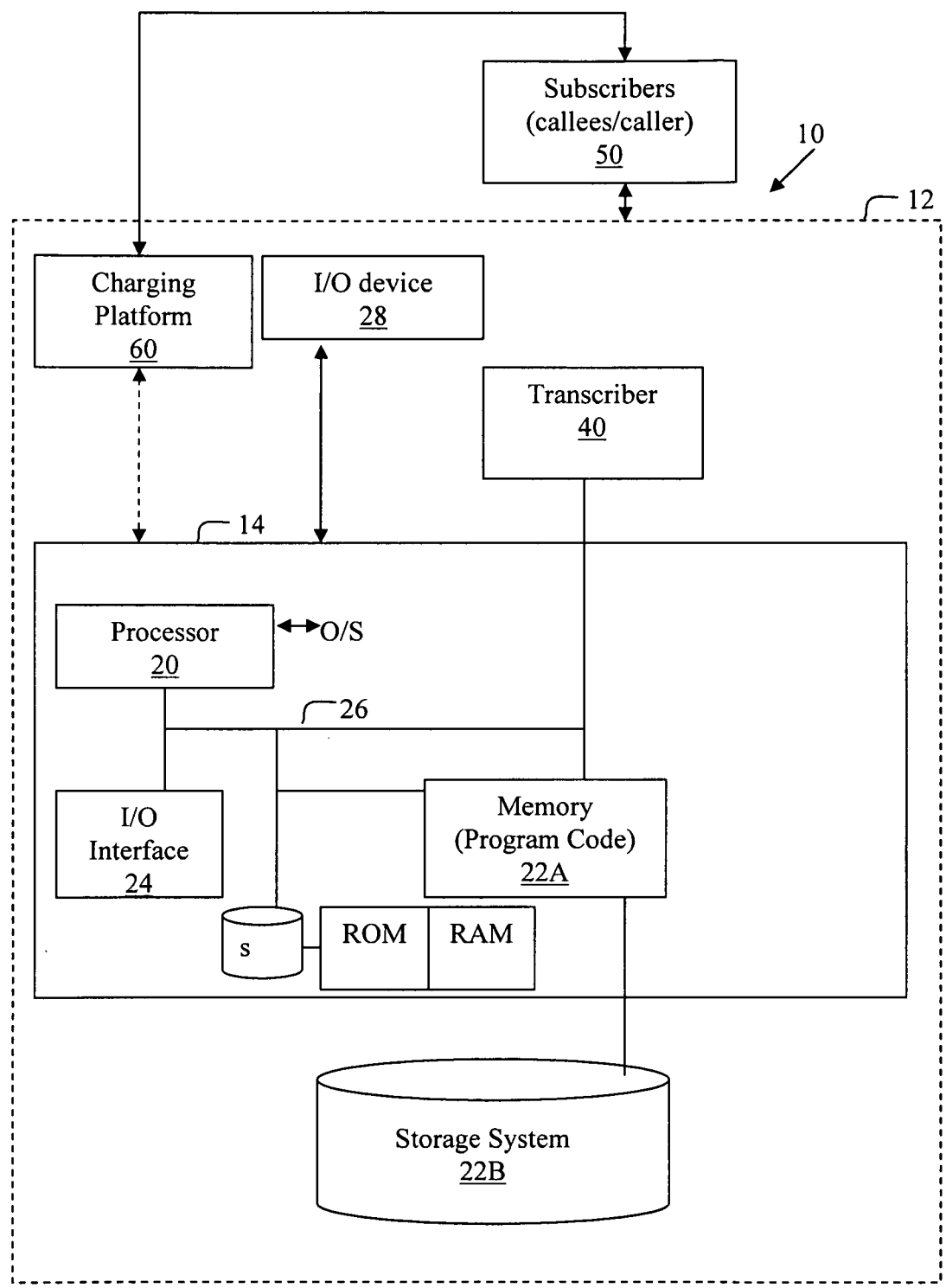
FIG. 1 shows an illustrative environment for implementing processes in accordance with the invention.

The invention generally relates to a system and methods of providing voice transcription and, in particular, to a system and methods for providing SIP (session initiation protocol) based voice transcription services. More specifically, the system and methods of the present invention use SIP based architecture (infrastructure) to provide a mechanism for transcribing voice to text in real-time or send a voice conversation to an off-line mechanism for recording and creating a transcript of the voice conversation. ("Transcribe" and variations thereof are used herein interchangeably with the terminology "translation" and variations thereof.) In the latter scenario, the system and methods can record the conversation for future transcribing of the conversation using, for example, a media server on an IP Multimedia Subsystem (IMS) platform. In embodiments, the system and methods also provide a mechanism requesting a callee (non-requesting user) to authorize recording of a conversation for future transcription.

In further embodiments, the system and methods provide a mechanism for determining which speaker is speaking in order identify each person in the transcription of the voice conversation. For example, the identification may be accomplished by determining the device SIP_ID and correlating such device SIP_ID with a waveform of speech of the callee or caller. The device SIP_ID can be determined in a conventional manner such as, for example, when establishing a VOIP session or logging into a media server on an IMS platform. Also, it is contemplated that the profile information of the device (e.g., user) can be stored to distinguish the caller and callees within the call. In additional embodiments, the system and methods of the present invention provide a mechanism for billing voice to text services using diameter-based protocol.

Advantageously, by implementing the present invention it is possible for a caller/callees to have their conversation transcribed, which may be used for many different reasons. For example, there are many instances where hearing a person on a cellular telephone may be difficult because the listening user is either hearing impaired or in a noisy environment such that they cannot hear the person on the other telephone. This often happens in crowded situations like stores or airports. In other situations, it is convenient for users to have the ability to record and transcribe their conversations to text such as, for example, to memorialize the conversation or to refer back to the text to refresh one's recollection. Prior to the invention, this often required a person to take accurate notes and then provide a summary of the call, or for a transcriber to listen to the call and transcribe the call to text. Both of these methods are time consuming, expensive to undertake and, in some instances, may not provide an accurate transcription of the conversation. Also, these methods could not be provided very efficiently in real-time.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device,
a transmission media such as those supporting the Internet or intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

More specifically, FIG. 1 shows an illustrative environment 10 for managing the processes in accordance with the invention. To this extent, the environment 10 includes a server 12 that can perform the processes described herein. In particular, the server 12 can be a media server that includes a computing device 14. The computing device 14 and/or server 12 can be resident on a carrier network infrastructure, content provider infrastructure or other third party service provider (any of which is generally represented in FIG. 1). By using this computing device 14, the network carrier, etc. will not have to make any significant infrastructure investments, as the preexisting infrastructure is utilized with the present invention.

The computing device 14 and/or server 12 include the computer program code (program code logic) configured to make computing device 14 and/or server 12 operable to perform the services and/or processes described herein. More specifically, a transcriber 40 (which can be resident on the media server on an IMS platform) may include the program code as one or computing modules implemented in memory 22A, which is serviced and/or maintained by a service provider such as, for example, a network carrier. In embodiments, the transcriber 40 can be a separate server, e.g., voice to text server, can be one or more separate modules based on the different functions described herein or can be a component on the media server itself. In further embodiments, as should be understood by those of skill in the art, the transcriber 40 can merely be representative of the media server 12, which provides the functions described herein. As such, the terminology "transcriber" and "media server" can be used interchangeably herein, with the understanding that they may be the same or different modules, depending on the specific architecture.

The transcriber 40 extends the capabilities of an IMS platform to deliver transcription services of a conversation between one or more subscribers 50 (callees/caller). This allows the one or more subscribers 50 to obtain a text transcription of a voice conversation in either real-time or off-line. The transcription can be activated by, for example, a subscriber 50 (e.g., the caller or the callee) depressing a certain keypad button on the telephone or through voice recognition algorithms. In this way, the transcriber 40 (or the media server, itself) can become a listening device to the conversation and provide a transcription of the conversation in either real-time or off-line. In the off-line mode, the conversation may first be recorded and placed in a queue for transcription at a later time. The media server 12 may perform the recording. In embodiments, the conversations are based on SIP within the IMS architectural framework for delivering Internet protocol (IP) multimedia services.

In embodiments, the transcriber 40 can determine the ID of the callee or caller using their SIP_ID. The SIP_ID can then be used to determine the active voice for voice to text transcribing. For example, the transcriber 50 can use the SIP_ID of caller "A" and callee "B" to correlate with a waveform (speech) of the caller "A" and callee "B". As the waveform changes, the transcriber 40 will identify and mark the speaking user and begin transcribing the voice of the speaking user. As should be understood by those of skill in the art, marking is used to identify the speaking user so that it can be accurately depicted in the text transcription.

The transcriber 40 (or media server) can record the conversation for future transcription. In this scenario, the transcriber 40 or other part of the computing infrastructure 10 may first request permission from the callee (e.g., the user not requesting the transcription) to record the conversation. Upon authorization, e.g., by depressing a certain keypad button or confirming using speech recognition algorithms (yes/no voice recognition), the transcriber 40 will begin the recording and thereafter transcription processes described herein. During the transcription processes, the transcriber 40 will mark the identity of the speaking user during the recording (or during active, real-time transcribing) to ensure that the transcription accurately identifies the speakers. This is especially useful when the call is a conference call that may include three or more users on individual telephones.

In embodiments, the transcriber 40 actively transcribes the speaker's voice (user currently speaking) and provides that transcription to the non-speaking user. The transcription may be provided, for example, by a text message or instant message. The speaker may obtain the transcription of his/her own voice by accessing a storage system 22B, which stores the transcription. The storage system 22B can also store the entire transcription and, in embodiments, the transcriber 40 or other part of the computing infrastructure 10 can provide a notification to any of the subscribers 50 that the transcription is ready to be viewed.

Many additional customizations and options are also contemplated by the present invention. These customizations and options can stand-alone or be combined in any desired configuration with the other features discussed herein. Also, each of the customizations and options can be provided by a service provider, content provider, network carrier or any combination thereof, using their own infrastructures and environments. The service provider, content provider, network carrier or any combination thereof can charge separately, together or any combination thereof for providing the customizations and options.

For example, in embodiments, even though the subscribing user(s) 50 can receive a transcription in real-time or off-line, it is expected that some information may not be able to be recorded and/or transcribed due to background noise. In this case, the transcriber 40 (or other part of the computing infrastructure) may notify any of the parties to the conversation that it is not possible to provide an accurate transcription due to background noise. In response, the users can take appropriate action such as, for example, move to a quieter location, speak louder or attempt to suppress in some way the extraneous noise.

In further examples, user profiles and, even, voice prints of individuals can be saved in a centralized location such as, for example, the storage system 22B. Centralizing the user profiles allows for quick searches, and also provides the ability to cache the information for performance. It also provides for storage of the information even after the call is terminated. Additionally, by using a matching algorithm, it is possible to identify one or more users using voiceprints, without knowing the SIP_ID. In this way, the transcriber 40 can identify the speaker and mark the transcription accordingly.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a display, keyboard and pointing device.

In general, the processor 20 executes the computer program code, which is stored in the memory 22A and/or storage system 22B. While executing the computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 60 is maintained to provide charging models to charge for services rendered. The charging platform 60 may be maintained, deployed, created and/or serviced by the service provider. The charging platform 60 is designed to generate a charging record for services rendered to the subscriber user 50. In embodiments, the service provider can calculate an amount to be charged, based on many different considerations and generate the charging record to be sent to the charging platform 80. In turn, the charging platform 60 can generate an invoice and/or deduct a usage charge from an account of the subscriber. The billing may be, for example, batch driven billing based on voice to text conversations.

In embodiments, the invention provides a business method that performs the steps of the invention on a subscription, advertising, and/or fee basis. That is, a service provider, such as a Solution Integrator or location based service, could offer to perform the processes described herein. In this case, the service provider can create, maintain, deploy, support, etc., the computer infrastructure that performs the process steps of the invention for one or more customers. The customers may be, for example, any user requesting transcription services. In return, the service provider can receive payment from the customer(s) under a subscription and/or fee agreement and/or the service provider can receive payment from the sale of advertising content to one or more third parties.

Exemplary Processes

FIGS. 2-5 illustrate exemplary processes in accordance with the present invention. The steps of FIGS. 2-5 may be implemented on the computer infrastructure of FIG. 1, for example. The swim lane diagrams (flow diagrams) in FIGS. 2-5 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements implemented in the environment of FIG. 1. Software includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device as discussed herein and more specifically above. For example, the medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 2:
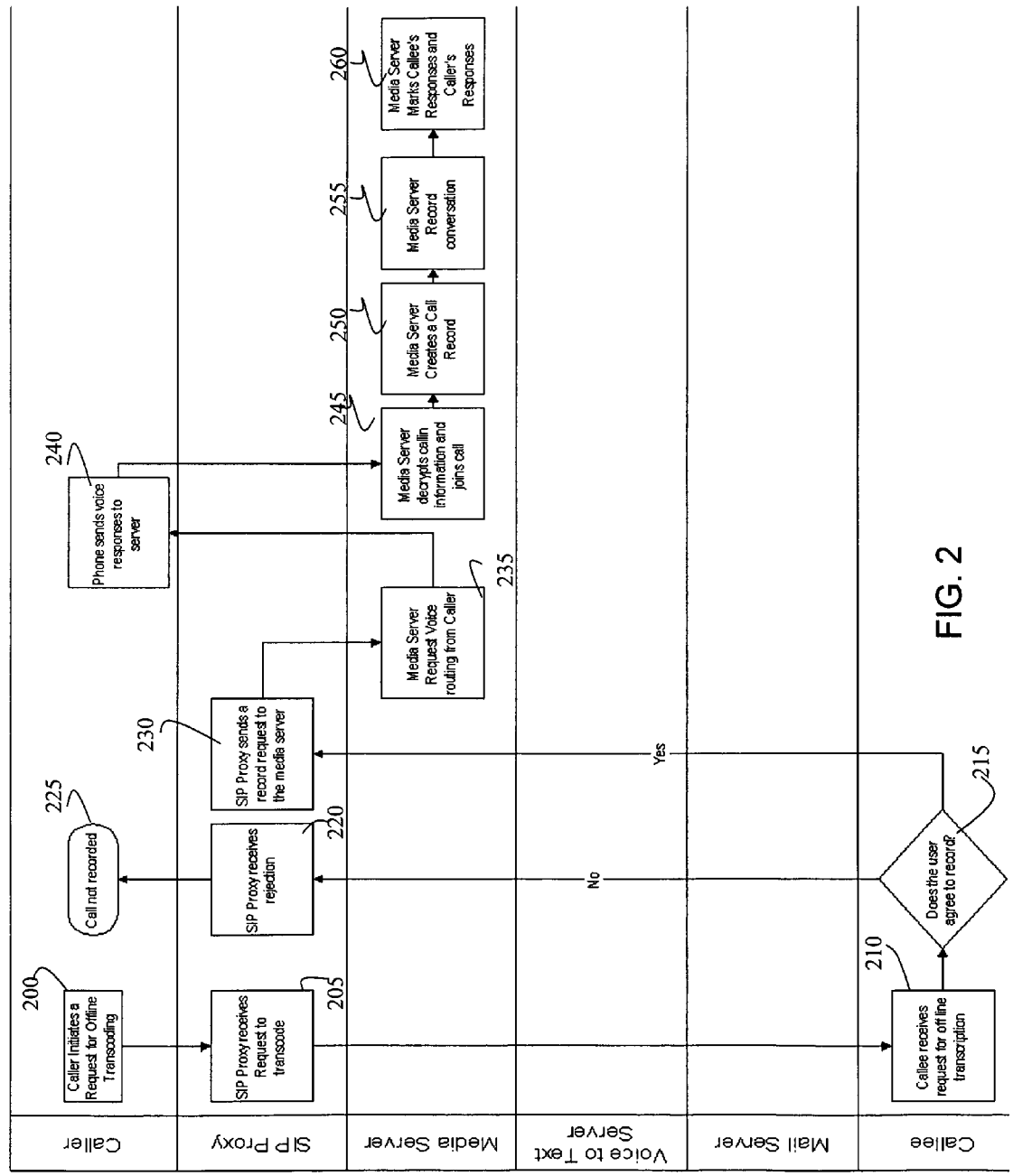
FIG. 2 is a swim lane diagram showing a process of recording a SIP based transcription handshake in accordance with aspects of the present invention.

FIG. 2 is a swim lane diagram showing a process of recording a SIP based transcription handshake in accordance with aspects of the present invention. Whether the system is recording for active or off-line transcription, the system sets up the initial transactions using the flow of FIG. 2. FIG. 2 shows four active roles: a callee, a media server (which may include the transcriber, in embodiments), a SIP Proxy and the caller. Those of skill in the art should understand that the mail server, voice to text server (transcriber), media server and SIP Proxy may reside on the computing infrastructure of FIG. 1, or may reside on a separate computing infrastructure, as either one or more program modules.

At step 200, the caller sends a request to the callee via the SIP proxy for off-line transcoding. At step 205, the SIP proxy receives the request to transcode. At step 210, the callee receives the request for off-line transcription. At step 215, the callee can either accept or reject a request to record the conversation. If the callee rejects the request to record the conversation, at step 220, the SIP Proxy will receive the rejection and, at step 225, the caller will receive from the SIP proxy a notification that permission to record the conversation has been denied.

If the callee accepts the request to record, at step 230, the SIP Proxy will receive the acceptance and send a record request to the media server (e.g., transcriber). At step 235, the media server will request voice routing from the caller. More specifically, the media server makes a SIP request back to the caller. In this case, it is possible to use a trusted token that is passed to the SIP proxy, and later to the media server that can be used to authenticate the media server. In this case, the wireless device (e.g., telephone) can act as a server waiting for a request.

Once the media server authenticates itself with the caller, the caller's device sends the call in information to the media server at step 240. That is, the caller's wireless device will send a voice response to the media server. At step 245, the media server will decrypt the call-in information and will join the call. At step 250, the media server creates a call record and, at step 255, the media server will record the conversation. For example, the media server will dial into the call, create a call record to indicate the system has started recording, and the system can begin recording. The caller sends the callee's SIP, callee's IP, caller's SIP and caller SIP_ID to the media server, prior to any transcription; although this step can be done concurrently or after the transcription. If done afterward, the system and method will correlate the stop and start times (e.g., timestamp) of the speaking users for later identification. If the call is an off-line call, the system will generate an off-line decode call record.

If the call is for active transcription, it can create an active call record start. At step 260, the media sever will mark the callee's and the caller's response.

Figure 3:
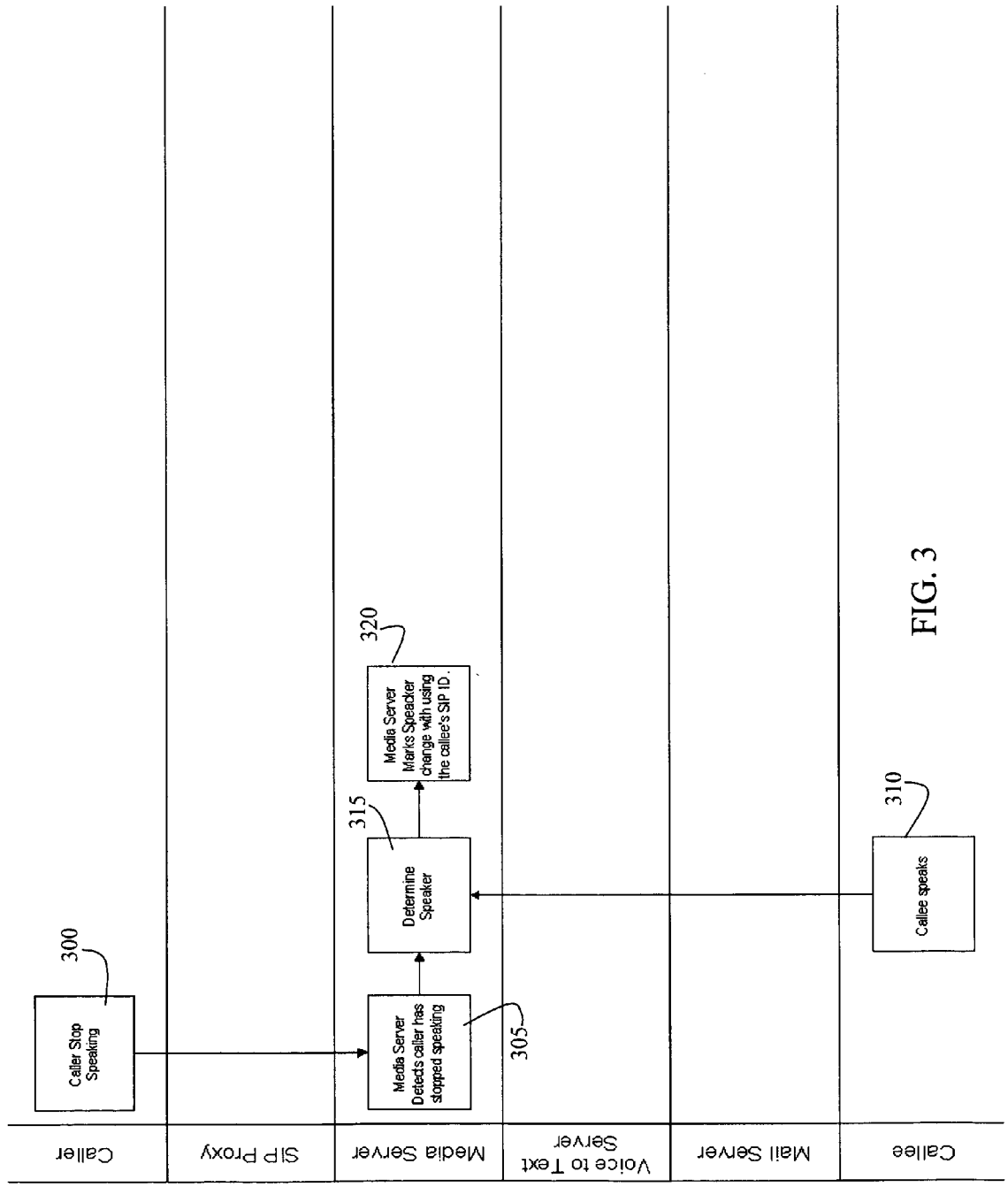
FIG. 3 is a swim lane diagram showing a process of marking a transcript in accordance with aspects of the present invention.

FIG. 3 is a swim lane diagram showing a process of marking in accordance with aspects of the present invention. Marking is the process of determining where in the call someone was speaking. In embodiments, during the marking phase, the media server marks the user's speech with their SIP_ID. This allows the system to have multiple users on a call and to distinguish which user in the transcript made a comment, e.g., is speaking. Also, in this example, both wireless devices (telephones) send separate streams to the media server, which can be used to determine when a speaker changes and to mark the audio file with the speaker's SIP_ID. More specifically, the media server marks who is speaking in the conversation by using, for example, which SIP_ID is talking and marking that SIP_ID in the audio file as part of the marker. This is accomplished by using different streams from each wireless device.

Referring still to FIG. 3, three active roles are shown: the callee, the media server and the caller. At step 300, the caller stops speaking. At step 305, the media server detects that the caller has stopped speaking. At step 310, the callee begins to speak. At step 315, the media server determines the identification of the speaker by, for example, detecting a particular waveform emanating from a specific SIP compliant device. At step 320, the media server marks the speaker change using the SIP_ID.

Figure 4:
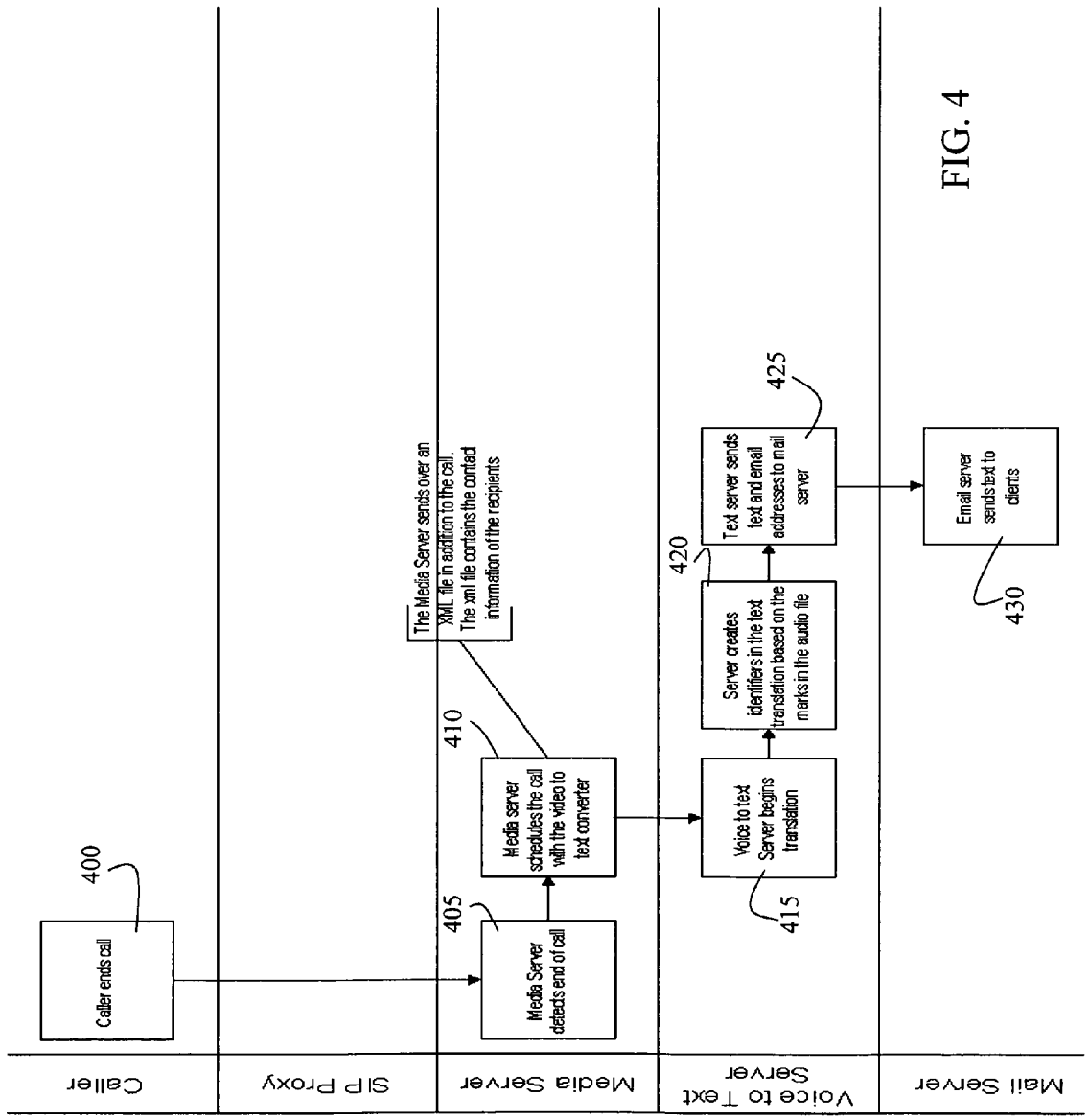
FIG. 4 is a swim lane diagram showing a process of off-line transcription in accordance with aspects of the present invention.

FIG. 4 is a swim lane diagram showing a process of off-line transcription in accordance with aspects of the present invention. In the off-line transcription, during the conversation the media server marks the speaker in the conversation as discussed above. Once the voice to text server (transcriber) begins the transcription, it can determine when a voice changes by looking for markers in the audio. Once the server has transcribed the audio, it uses the XML provided by the media server to determine who is to receive the message. The send value in the XML is used after the transcription to determine who requested to have the transcript sent to them. A sample XML is provided below.

```
<Caller>
SIP_ID value = string>
<email value= string>
<send value = boolean>
</Caller>
<Callee>
<SIP_ID value = string>
<email value= string>
<send value = boolean>
<Callee>
<Message>
<ID value=integer>
<Length value=time>
</Message>
```

Also, to perform the off-line transcription, the media server may record the conversation prior to the actual transcription. This may be advantageous in that the recorded conversation can be provided in a queue for later transcription, if such transcription is not immediately required. This can be used to load balance the performance of the server.

Referring still to FIG. 4, four active roles are shown: the mail server, the voice to text server (transcriber), the media server (which may include the transcriber, in embodiments) and the caller. At step 400, the caller ends a call. At step 405, the media server detects an end of the call. At step 410, the media server schedules the call with the video to the transcriber (e.g., voice to text server). In this step, the media server can send an XML file in addition to the call. The XML file, for example, can contain the contact information of the recipients, as discussed above. At step 415, the voice to text server receives the voice conversation and begins to translate (transcribe) the conversation.

At step 420, the voice to text server creates identifiers in the text translation based on the marks in the audio file. These identifications will be the identification of the speaker, in the transcription. At step 425, the voice to text server sends the text and email addresses of the recipients to the mail server. At step 430, the mail server will send the text to the clients (subscribing parties). In addition, the mail server may also send a notification that the text is saved in a database and that access can be granted by hyperlinking, for example, to a given address. In embodiments, the text of the speaker is given only to the non-speaking caller/callees; although, it is contemplated that the text can be given to all users. In embodiments, the transcribed files of each speaker can be merged using timestamps within the transcript.

Figure 5:
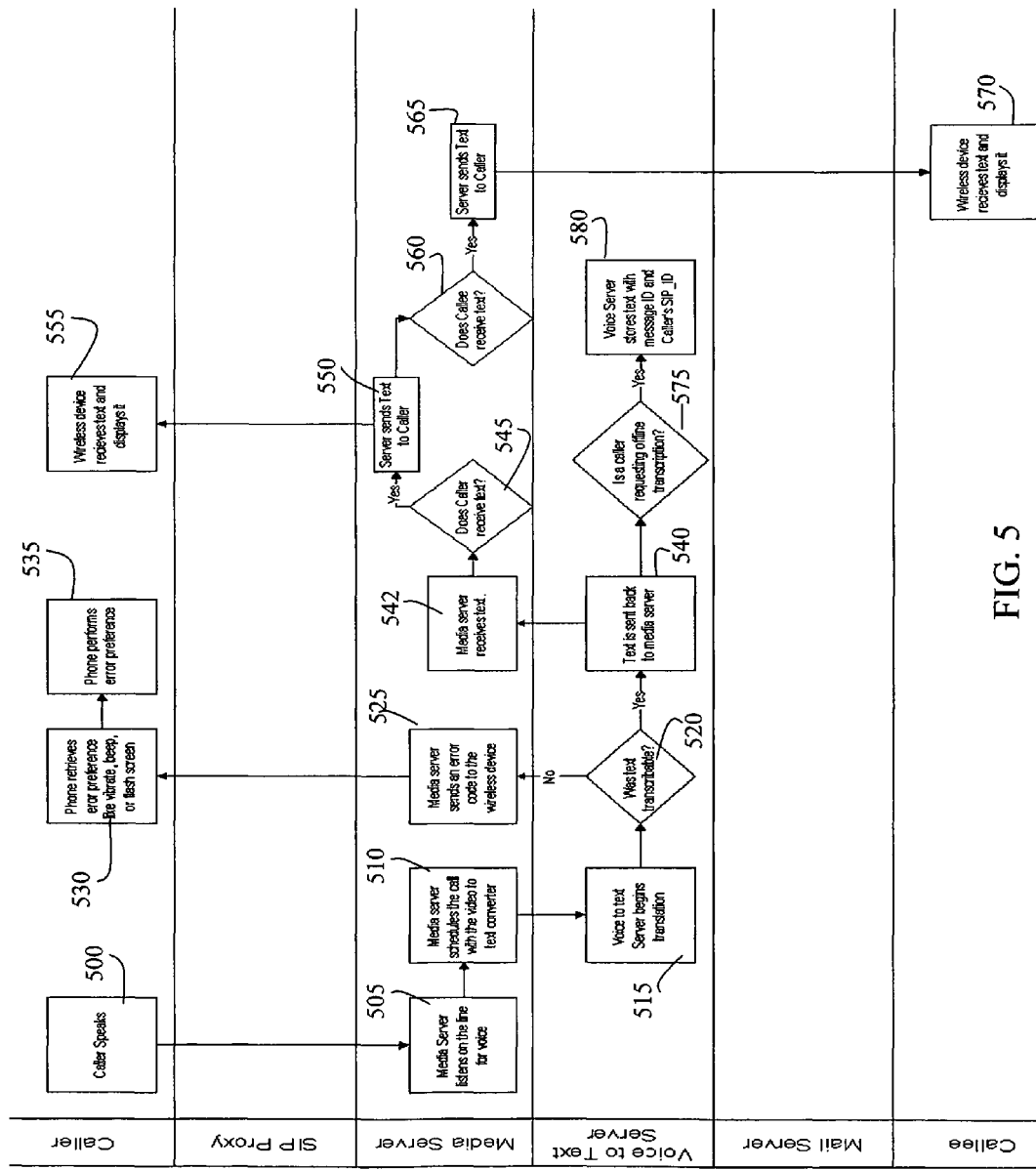
FIG. 5 is a swim lane diagram showing a process of active translation (transcription) in accordance with aspects of the present invention.

FIG. 5 is a swim lane diagram showing a process of active translation (transcription) in accordance with aspects of the present invention. The flow of FIG. 5 shows the caller speaking, although this figure can equally represent the callee speaking. In contemplated embodiments, the voice to text may be in real-time for one person, but off-line for the other users. Also, as the system is already performing the transcription, it will not waste cycles later transcribing the conversation in a batch process. In addition, it is contemplated that the call can be recorded while receiving active transcription. Also, if the voice to text server cannot translate the user, it can send an error code back to the user's telephone. The user's telephone can check the type of error response and inform the user. Also, both the caller and callees can receive text in real-time if requested.

FIG. 5 shows four active roles: the callee, the voice to text server (transcriber), the media server (which may include the transcriber, in embodiments) and the caller. At step 500, the caller is speaking. At step 505, the media server listens on the line for the voice. At step 510, the media server schedules the call with the video to text converter (video to text server). At step 515, the voice to text server begins the translation (transcription). At step 520, the voice to text server determines whether the text was capable of being transcribed, e.g., transcribed into text. If it is not possible to transcribe into text, at step 525, the media server will send a code to the wireless device (e.g., telephone). At step 530, the wireless device (telephone) will retrieve the error preference. The error preference may be programmed as vibrate, beep, flashing screen, etc. At step 535, the wireless device will perform the error preference, notifying the caller that the voice was unable to be transcribed.

If, at step 520, it was determined that the text can be transcribed, at step 540, the text is sent back to the media server. At step 542, the media server receives the text. At step 545, the media server makes a determination as to whether the caller should receive the text. If the caller is to receive the text, then the text is sent to the caller at step 550. The wireless device of the caller receives and displays the text at step 555. Also, at step 560, the media server makes a determination as to whether the callee should receive the text. If the callee is to receive the text, at step 565, the media server will send the text to the caller. At step 570, the wireless device of the callee receives and displays the text.

Referring back to step 540, the flow can also follow to step 575. At step 575, the voice to text server determines whether the caller is requesting the transcription off-line. If the caller is requesting the transcription off-line, at step 580, the voice to text server will store the text with a message ID and the caller's SIP_ID for later retrieval.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A computer implemented method comprising:
    transcribing a Session Initiation Protocol (SIP) based conversation between one or more users from voice to text transcription;
    identifying each of the one or more users that are speaking using a device SIP_ID of the one or more users;
    marking the identity of the one or more users that are speaking in the text transcription;
    receiving a request to record the conversation, the request comprising a confirmation to use voice recognition algorithms for recording the conversation;
    receiving authorization from a non-requesting user to record the conversation;
    determining whether the SIP based conversation is accurately transcribed from the voice to the text transcription;
    providing an error notification in response to the SIP based conversation not being accurately transcribed from the voice to the text transcription;
    providing a notification that the recorded conversation has been accurately transcribed from the voice to the text transcription in response to the SIP based conversation being accurately transcribed from the voice to the text transcription, the text transcription being saved in a database, and access to the text transcription being granted through a hyperlinked address;
    providing the text transcription of the speaking user to non-speaking users; and
    authenticating a media server with the one or more users that are speaking using the device SIP_ID of the one or more users using a trusted token, and after authenticating the media server, a caller's device will send call-in information to the media server.

2. The method of claim 1, further comprising correlating the device SIP_ID with the speaking user.

3. The method of claim 2, wherein the correlating includes identifying a waveform of speech of the speaking user to the device SIP_ID.

4. The method of claim 2, further comprising storing the device SIP_ID in a central repository.

5. The method of claim 1, further comprising storing profile information of the one or more users in a repository in order to distinguish between the speaking and non-speaking users.

6. The method of claim 1, further comprising storing voiceprints of the one or more users in a repository in order distinguish between the speaking and non-speaking users.

7. The method of claim 1, further comprising billing the one or more users for the text transcription using diameter-based protocol.

8. The method of claim 1, wherein the text transcription is provided in real time by sending an instant message.

9. The method of claim 1, further comprising recording the conversation and placing the recorded conversation in a queue for off-line transcription with a message ID and caller SIP_ID.

10. The method of claim 1, further comprising dialing into a call between the one or more users, creating a call record to a start of recording, beginning the recording, and receiving a callee's SIP, callee's IP, caller's SIP and caller SIP_ID.

11. The method of claim 1, wherein the steps are provided on a hardware component or a combination of the software component and the hardware component.

12. The method of claim 1, wherein the error notification is a vibration, beep, or flashing screen.

13. The method of claim 12, further comprising providing the text transcription to one set of the one or more users in real-time and providing the text transcription to another set of the one or more users off-line.

14. The method of claim 1, wherein the error notification informs the one or more users that the SIP based conversation is not accurately transcribed due to background noise.

15. The method of claim 1, wherein the text transcription of the speaking user is provided to the non-speaking users based on a Boolean send value in an XML message.

16. A computer program product comprising a non-transitory computer usable storage medium having readable program code embodied in the storage medium, the computer program product being operable to:
    listen into an established conversation between one or more users on an IMS platform;
    transcribe the conversation from voice to text transcription;
    identify each of the one or more users in the text transcription using a device SIP_ID of the each of the one or more users;
    receive a request to record the conversation, the request comprising a confirmation to use voice recognition algorithms for recording the conversation;
    receive authorization from a non-requesting user to record the conversation;
    determine whether the established conversation is accurately transcribed from the voice to the text transcription;
    provide an error notification in response to the established conversation not being accurately transcribed from the voice to the text transcription;

provide a notification that the recorded conversation has been accurately transcribed from the voice to the text transcription in response to the established conversation being accurately transcribed from the voice to the text transcription, the text transcription being saved in a database, and access to the text transcription being granted through a hyperlinked address; and authenticate a media server with the one or more users that are speaking using the device SIP_ID of the one or more users using a trusted token, and after authenticating the media server, a caller's device will send call-in information to the media server.

17. The computer program product of claim 16, wherein the computer program product is further operable to record the conversation between the one or more users and place the conversation in a queue for the transcribing with a message ID and caller SIP_ID.

18. The computer program product of claim 17, wherein the computer program product is further operable to notify the one or more users that the text transcription is available for review.

19. The computer program product of claim 16, wherein the computer program product is further operable to provide the text transcription of a speaking user to a non-speaking user by instant message.

20. The computer program product of claim 16, wherein the conversation is a Session Initiation Protocol (SIP) based conversation.

21. The computer program product of claim 16, wherein the computer program product is further operable:
  correlate the device SIP_ID with a speaking user;
  store the device SIP_ID and profile information of the one or more user in a repository in order to distinguish between the speaking user and non-speaking users; and one of:
    provide the text transcription in real time by sending a text message or instant message; and
    record the conversation and place the recorded conversation in a queue for off-line transcription.

22. The computer program product of claim 16, wherein the computer program product is further operable: dial into a call between the one or more users, create a call record to a start of the recording, begin the recording, and receive a callee's SIP, callee's IP, caller's SIP and caller SIP_ID.

23. A system implemented on a computer infrastructure having at least hardware components or a combination of software components and the hardware components operable to:
  listen into an established conversation between one or more users;
  identify each of the one or more users in the conversation using a device SIP_ID of the each of the one or more users;
  receive a request to record the conversation, the request comprising a confirmation to use voice recognition algorithms for recording the conversation;
  record the conversation between the one or more users and place the conversation in a queue for the transcribing;
  transcribe the conversation from voice to text transcription;
  mark a speaking user in the text transcription using the device SIP_ID of the each of the one or more users;
  determine whether the established conversation is accurately transcribed from the voice to the text transcription;
  notify the one or more users that an error has occurred in response to the established conversation not being accurately transcribed from the voice to the text transcription;
  notify the one or more users that the text transcription has been accurately transcribed from the voice to the text transcription in response to the established conversation being accurately transcribed from the voice to the text transcription, the text transcription being saved in a database, and access to the text transcription being granted through a hyperlinked address;
  provide the text transcription of a speaking user to a non-speaking user by instant message or text message; and
  authenticate a media server with the one or more users that are speaking using the device SIP_ID of the one or more users using a trusted token, and after authenticating the media server, a caller's device will send call-in information to the media server.

24. The system of claim 23, wherein the at least hardware components or a combination of software components and the hardware components is further operable to:
  correlate the device SIP_ID with the speaking user;
  store the device SIP_ID in a repository in order to distinguish between the speaking user and non-speaking users;
  receive authorization from a non-requesting user to record the conversation; and
  provide notification that the recorded conversation has been transcribed from the voice to the text transcription.

25. The system of claim 23, further comprising dialing into a call between the one or more users, creating a call record to a start of the recording, beginning the recording, and receiving a callee's SIP, callee's IP, caller's SIP and caller SIP_ID.

26. A method or transcribing a voice conversation using Session Initiation Protocol (SIP) from voice to text, comprising:
  providing a computing infrastructure operable to:
    call into an established conversation between one or more users;
    identify each of the one or more users that are speaking using a device SIP_ID of the one or more users;
    receive a request to record the conversation, the request comprising a confirmation to use voice recognition algorithms for recording the conversation;
    receive authorization from a non-requesting user to record the conversation;
    transcribe the conversation between one or more users from voice to text transcription;
    mark the identity in the text transcription of the one or more users that are speaking;
    determine whether the established conversation is accurately transcribed from the voice to the text transcription;
    provide an error notification in response to the established conversation not being accurately transcribed from the voice to the text transcription:
  provide a notification that the established conversation has been accurately transcribed from the voice to the text transcription in response to the established conversation being accurately transcribed from the voice to the text transcription, the text transcription being saved in a database, and access to the text transcription being granted through a hyperlinked address;

provide the text transcription to the one or more users using instant messaging or text messaging; and authenticate a media server with the one or more users that are speaking using the device SIP_ID of the one or more users using a trusted token, and after authenticating the media server, a caller's device will send call-in information to the media server.

27. The method of claim 26, wherein the computing infrastructure is further operable to:

record the conversation and place the conversation in a queue for the transcribing;

store the device SIP_ID in a repository in order to distinguish between the speaking and non-speaking users; and provide notification that the recorded conversation has been transcribed from the voice to the text transcription.

\* \* \* \* \*